(12) United States Patent
Koshizen et al.

(10) Patent No.: US 11,217,248 B2
(45) Date of Patent: Jan. 4, 2022

(54) CONVERSATION DEVICE AND CONVERSATION SYSTEM

(71) Applicant: Honda Motor Co., Ltd., Tokyo (JP)

(72) Inventors: Takamasa Koshizen, Saitama (JP); Kazunori Kuroda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 16/820,721

(22) Filed: Mar. 17, 2020

(65) Prior Publication Data
US 2020/0312323 A1    Oct. 1, 2020

(30) Foreign Application Priority Data

Mar. 27, 2019    (JP) .............................. JP2019-061716

(51) Int. Cl.
| | |
|---|---|
| *G10L 15/00* | (2013.01) |
| *G10L 15/22* | (2006.01) |
| *G10L 15/30* | (2013.01) |
| *G10L 15/183* | (2013.01) |
| *G10L 15/06* | (2013.01) |
| *G10L 15/18* | (2013.01) |

(52) U.S. Cl.
CPC .............. *G10L 15/22* (2013.01); *G10L 15/30* (2013.01); *G10L 15/063* (2013.01); *G10L 15/183* (2013.01); *G10L 15/1822* (2013.01)

(58) Field of Classification Search
CPC combination set(s) only.
See application file for complete search history.

(56) References Cited

FOREIGN PATENT DOCUMENTS

JP    2018064639    4/2018

*Primary Examiner* — Vu B Hang
(74) *Attorney, Agent, or Firm* — JCIPRNET

(57) ABSTRACT

A conversation device that has conversation with a user of an electric wheelchair traveling in a facility in which a plurality of beacon transmitters are disposed includes: a conversation processing part that has conversation with the user using a prediction model; a conversation registration part that stores the conversation as a history; and a model generation part that generates the prediction model through learning, in which in the history of the conversation, a situation of the conversation at a time point when the conversation is made, details of the conversation, and a user's satisfaction with the conversation are associated, the situation of the conversation includes information with which the beacon transmitter that has received radio waves during the conversation is able to be identified, and the model generation part learns the prediction model again at a predetermined timing by classifying the history of the conversation.

5 Claims, 6 Drawing Sheets

| Time(ms) | RSSI(dBm) | Beacon(ID) | Check-in |
|---|---|---|---|
| xxxxxx | xxxxxx | xxxxxx | NO |
| xxxxxx | xxxxxx | xxxxxx | YES |

FIG. 4

| number of times speech is made for wheelchair user \ parameter | beacon ID | advancing direction distance | AI-side speech • keyword • field | satisfaction (•facial expression •voice) | |
|---|---|---|---|---|---|
| first time | 3012 | 10m | weather | 0.5 | ⎫ cluster A |
| second time | 2912 | 5m | entertainment | 0.2 | ⎬ |
| third time | 5219 | 2m | sports | 0.9 | ⎫ cluster B |
| ⋮ | | | | | ⎬ |
| n-th time | | | | | ⎫ cluster C |
| ⋮ | | | | | |

FIG. 5

CONVERSATION DEVICE AND CONVERSATION SYSTEM

CROSS-REFERENCE TO RELATED APPLICATION

This application claims the priority of patent Japan application serial no. 2019-061716, filed on Mar. 27, 2019. The entirety of the above-mentioned patent application is hereby incorporated by reference herein and made a part of this specification.

BACKGROUND

Technical Field

The present invention relates to a conversation device and a conversation system and particularly to a conversation method for a moving person who moves indoors.

Description of Related Art

In the related art, a technology of providing information for assisting safety when traveling using a moving assist device (for example, an electric wheelchair) is known (see Patent Document 1). According to the technology disclosed in Patent Document 1, pressure distribution information and position information received from the electric wheelchair are stored, and a point at which a degree of change in pressure distribution is large and points before and after the points are specified as dangerous points. Also, in a case in which the electric wheelchair during traveling has approached the dangerous points, a warning indicating that the electric wheelchair has approached dangerous points is issued from an in-vehicle device in the electric wheelchair.

Patent Documents

[Patent Document 1] Japanese Patent Laid-Open No. 2018-064639

However, since the related art is adapted for the purpose of assisting safety during traveling of an electric wheelchair, although information provided is useful for a wheelchair user, the wheelchair user may feel bored in some cases.

The invention was made in view of the aforementioned point, and provides a conversation device and a conversation system that prevent a wheelchair user from feeling bored.

SUMMARY

According to an embodiment of the invention, there is provided a conversation device that has conversation with a user of an electric wheelchair traveling in a facility in which a plurality of beacon transmitters are disposed, the conversation device including: a conversation processing part that has conversation with the user using a prediction model that predicts a topic in which the user is interested; a conversation registration part that stores the conversation as a history; and a model generation part that generates the prediction model through learning using the stored history of the conversation, in which in the history of the conversation, a situation of the conversation at a time point when the conversation is made, details of the conversation, and a user's satisfaction with the conversation are associated, the situation of the conversation includes information with which the beacon transmitter that has received radio waves during the conversation is able to be identified, the model generation part learns the prediction model again at a predetermined timing by classifying the history of the conversation using elements included in the history of the conversation as parameters, and the conversation processing part predicts the topic in which the user is interested by inputting, to the prediction model, a current situation of the conversation including information for identifying the beacon transmitter that is present in the surroundings of the traveling electric wheelchair and has conversation on the basis of the predicted topic.

BRIEF DESCRIPTION OF THE DRAWINGS

FIG. 4 illustrates an example of a table for managing a position of a user.

FIG. 5 is a diagram for explaining prediction model generation processing and illustrates an example of a conversation history.

DESCRIPTION OF THE EMBODIMENTS

According to the invention, it is possible to prevent the wheelchair user from feeling bored.

An embodiment of the invention will be described in detail with appropriate reference with drawings. The same reference signs will be applied to components which are the same, and repeated description will be omitted.

Configuration of Conversation System

Figure 1:
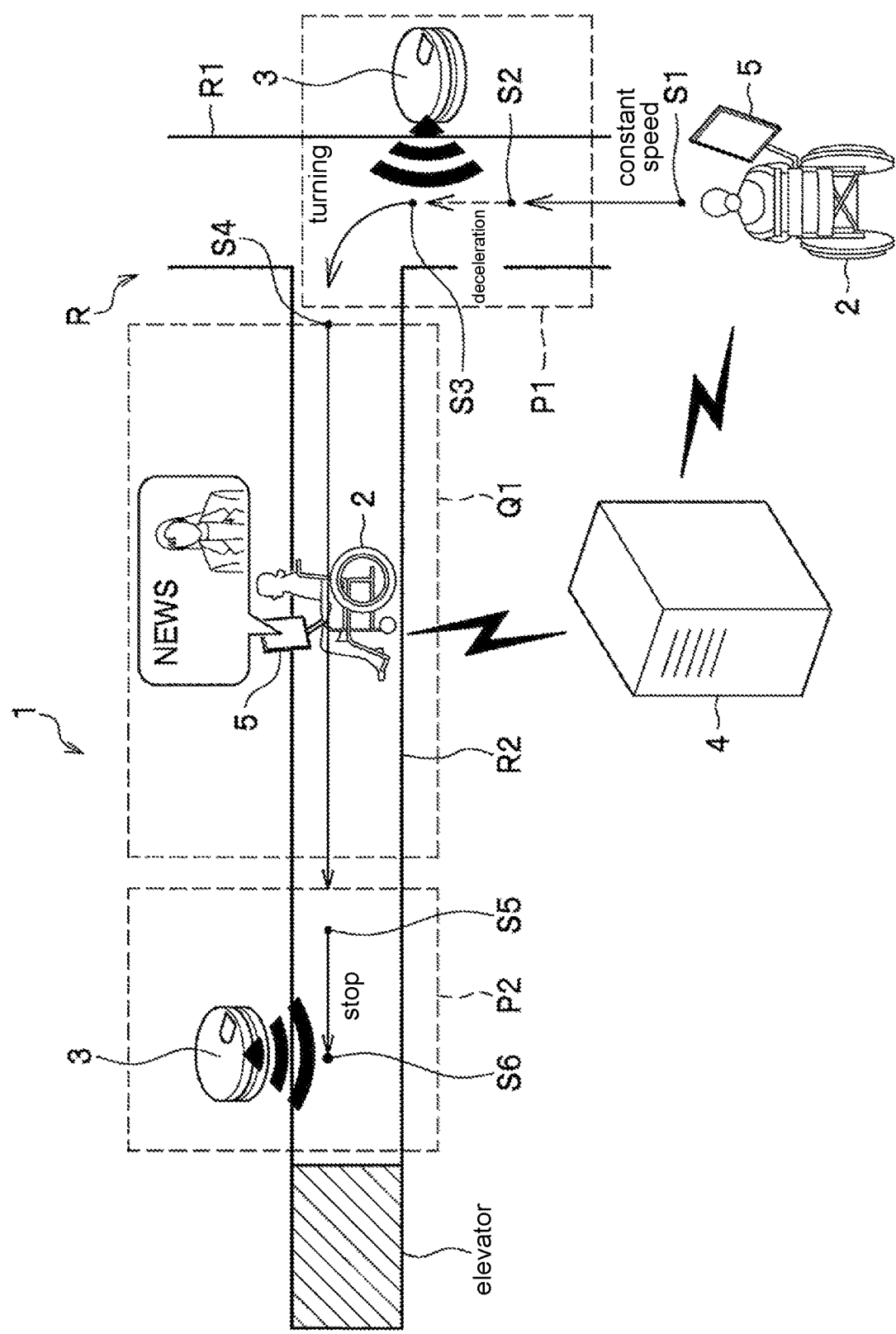
FIG. 1 is an outline configuration diagram of a conversation system according to an embodiment of the invention.

Referring to FIG. 1, a configuration of a conversation system 1 according to an embodiment will be described. FIG. 1 is an outline configuration diagram of the conversation system 1 according to the embodiment.

The conversation system 1 is a system that assists a wheelchair user to be able to appropriately travel in a facility and provides information (for example, news, weather forecast, schedules, and the like) in which the user is interested by speaking to the user using sound. The conversation system 1 can be applied to various situations in which a wheelchair travels and is particularly useful for traveling of a wheelchair in a facility in which the wheelchair can carry out automatic driving (for example, a hospital, a nursing facility, or the like). The following description will be given on the assumption that the facility is a hospital. However, this does not limit the range to which the conversation system 1 can be applied to a hospital.

The conversation system 1 includes an electric wheelchair 2 that travels in the facility using automatic driving (in other words, provided with an automatic driving function), a plurality of beacon transmitters 3 disposed along a traveling path R along which the electric wheelchair 2 travels, and a server 4 that controls traveling of the electric wheelchair 2. The electric wheelchair 2 includes an in-vehicle device 5 that is used mainly for conversation between the server 4 and the user. The in-vehicle device 5 may be configured such that the in-vehicle device 5 can be detached from the electric wheelchair 2. The server 4 is a cloud server provided on the Internet or a server provided inside the facility provided with the traveling path R of the electric wheelchair 2. Note that the server 4 is an example of the "conversation device" in the claims. Also, the electric wheelchair 2 may not have an automatic driving function and may travel in the facility in response to a user's steering operations.

The beacon transmitters 3 emit an electrical wave for wireless communication to the surroundings. Transmission frequencies and placement positions of the beacon transmitters 3 are set such that the beacon transmitters 3 have mutually different frequencies at least in a range in which radio wave reaching ranges overlap with each other. The server 4 stores the transmission frequencies and placement position coordinates (latitudes and longitudes, for example) in association with identification information (hereinafter, referred to as "beacon IDs") of the respective beacon transmitters 3, for example.

The electric wheelchair 2 receives radio waves from the beacon transmitter 3 that is present in the surroundings of the electric wheelchair 2 itself and transmits the frequency of the received radio waves and the like along with identification information (hereinafter, referred to as a "wheelchair ID") of the electric wheelchair 2 to the server 4 at predetermined time intervals. In this manner, the server 4 can calculate a change in position and an advancing direction of the electric wheelchair 2 and control the traveling of the electric wheelchair 2. In other words, who is traveling in which location of the facility is completely managed with the beacon IDs and the wheelchair IDs in the conversation system 1. Note that the beacon transmitter 3 may transmit the beacon ID of the beacon transmitter 3 itself to the electric wheelchair 2, and the electric wheelchair 2 may transmit the beacon ID along with the wheelchair ID of the electric wheelchair 2 itself to the server 4.

In addition, the electric wheelchair 2 receives information necessary to perform automatic driving (for example, information regarding a target vehicle speed and a target steering angle) from the server 4 via the radio waves of the beacon transmitter 3. The electric wheelchair 2 repeats checking-in and checking-out of the respective beacon transmitters 3 disposed in the facility by traveling in the facility and communicates with the server 4 via the beacon transmitters 3 with high reception strength, for example. Note that the electric wheelchair 2 may include a communication section other than the beacon transmitter 3 between the electric wheelchair 2 and the server 4 and may receive information necessary to perform automatic driving using this communication section.

The traveling path R includes locations that require control for of the electric wheelchair 2 and locations that do not require control for changing the traveling of the electric wheelchair 2 (including a case in which the traveling of the electric wheelchair 2 is slightly changed). Hereinafter, the former locations will be represented as a "first section Pm (m is identification information)", and the latter will be represented as a "second section Qn (n is identification information)'. The first section Pm is a region in which deceleration, stopping, turning, starting, and the like are performed, for example. The second section Qn is a region in which the electric wheelchair 2 travels at a constant speed, for example. The user who is traveling in the second section Qn is in a relatively stable state on the electric wheelchair 2. Such definition of the sections is registered in advance in a storage part provided in the server 4, for example.

For example, a path of advancing from a start point S1 illustrated in FIG. 1 toward the upper side on the paper, turning left at a T junction (T-shaped path) R1, further advancing to the left side on the paper through a straight route R2, and moving to a destination point S6 in front of an elevator may be assumed. Here, the point S2 is a point at which deceleration is started to turn left at the T junction R1, and the point S3 is a point at which turning is actually started. The point S4 is a point at which a steering angle is returned and advancing straight ahead is started, and the point S5 is a point at which stopping of deceleration is started. In this case, it is necessary to perform control for changing the traveling of the electric wheelchair 2 between the point S2 and the point S4 and between the point S5 and the destination point S6. Meanwhile it is not substantially necessary to perform control for changing the traveling of the electric wheelchair 2 between the point S4 and the point S5. Therefore, the section between the point S2 and the point S4 and the section between the point S5 and the destination point S6 are registered as first sections P1 and P2, and the section between the point S4 and the point S5 is registered as the second section Q1.

Note that the positions and the ranges of the first section Pm and the second section Qn may be set in association with the traveling path. In a case of advancing straight without turning left at the T junction R1 in FIG. 1, for example, it is substantially not necessary to perform control for causing the electric wheelchair 2 to change the traveling at the T junction R1 since it is not necessary to decelerate and turn at the points S2 and S3. Therefore, the inside of the T junction R1 can be registered as the second section Qn. Also, the positions and the ranges of the first section Pm and the second section Qn may be changed in accordance with a status of the user of the electric wheelchair 2. The status of the user is, for example, a degree of stability in a state in which the user is seated in the electric wheelchair 2, a health state of the user, or the like.

According to the embodiment, in a case in which the electric wheelchair 2 travels in the first section Pm, the server 4 causes the in-vehicle device 5 to output information related to a change in traveling using sound to notify the user of the change in traveling in advance or along with the control for changing the traveling. The information related to the change in traveling is, for example, information regarding a change in vehicle speed and a change in advancing direction and information regarding a phenomenon that causes the change in traveling. The phenomenon that causes the change in traveling is presence of a stepped difference or an oncoming car. Meanwhile, in a case in which the electric wheelchair 2 travels in the second section Qn, the server 4 causes the in-vehicle device 5 to output a topic that the user shows a high interest (in which the user is interested) using sound such that the user does not feel bored. The topic in the second section Qn is not a template sentence registered in advance, and the server 4 presumes the topic that to which the user is likely to show a high interest, in accordance with a situation. The topic in the second section Qn may be, for example, news, weather forecast, schedules, or the like. Details of generation of the topic in the second section Qn will be described later.

Figure 2:
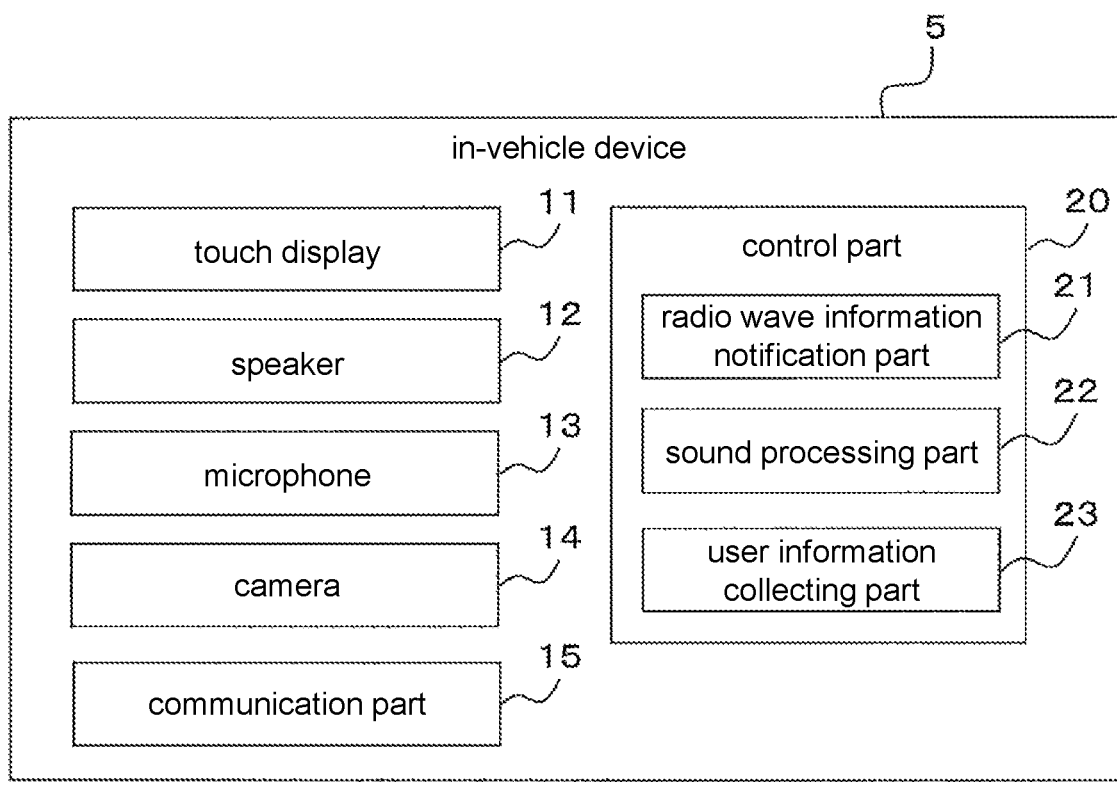
FIG. 2 is an outline configuration diagram of an in-vehicle device according to the embodiment of the invention.

Referring to FIG. 2, a configuration of the in-vehicle device 5 will be described. FIG. 2 is an outline configuration diagram of the in-vehicle device 5. The in-vehicle device 5 includes a touch display 11, a speaker 12, a microphone 13, a camera 14, a communication part 15, and a control part 20.

Note that the configuration of the in-vehicle device 5 is not limited to the configuration described herein, and some of functions of the in-vehicle device 5 may be configured as another device, for example.

The touch display 11 is an electronic part as a combination of a display device such as a liquid crystal panel and an input device such as a touch pad. The touch display 11 receives a data input from the user and displays various kinds of information for the user.

The speaker 12 is a device that converts an electric signal into sound and outputs sound data received from the server 4 as sound. The microphone 13 is a device that converts sound into an electric signal and converts sound of the user into sound data. The camera 14 is a device for capturing a video (including an image) and is, for example, a digital video camera. The camera 14 is placed at a position at which the camera 14 can image a facial expression of the user. The communication part 15 is a communication interface for wireless communication and performs communication with the server 4 via the beacon transmitters 3.

The control part 20 is realized through processing of executing a program using a central processing part (CPU) or by a dedicated circuit or the like. In a case in which the control part 20 is realized by the program, the program can be stored and provided in a computer-readable recording medium (example: CD-ROM). In addition, the program can be provided through a network such as the Internet.

The control part 20 mainly includes a radio wave information notification part 21, a sound processing part 22, and a user information collecting part 23. The functions illustrated in FIG. 2 are functions related to conversation with the user, in particular, and other functions related to automatic driving may also be provided.

The radio wave information notification part 21 analyzes the radio waves of the beacon transmitter 3 received via the communication part 15 and transmits information related to the radio waves to the server 4. The information related to the radio waves of the beacon transmitter 3 is, for example, a frequency of the received radio waves, and the radio wave information notification part 21 associates the information with the wheelchair ID and transmits the information to the server 4.

The sound processing part 22 receives sound data from the server 4 via the communication part 15 and causes the speaker 12 to output (speak) sound using the received sound data. Details of the sound data received from the server 4 differ between the case in which the electric wheelchair 2 travels in the first section Pm and the case in which the electric wheelchair 2 travels in the second section Qn. In the case in which the electric wheelchair 2 travels in the first section Pm, the sound data relates to a change in traveling. Meanwhile, in the case in which the electric wheelchair 2 travels in the second section Qn, the sound data relates to the topic to which the user is likely to show a high interest.

The user information collecting part 23 collects information indicating a reaction of the user after the user listens to the emitted sound (the sound of the topic to which the user is likely to show a high interest) in the case in which the electric wheelchair 2 travels in the second section Qn. The user information collecting part 23 images the facial expression of the user using the camera 14, for example, and transmits the captured video to the server 4. Also, the user information collecting part 23 records user's voice using the microphone 13, for example, and transmits the recorded voice to the server 4. Note that the user information collecting part 23 may perform both the imaging using the camera 14 and the recording using the microphone 13.

Figure 3:
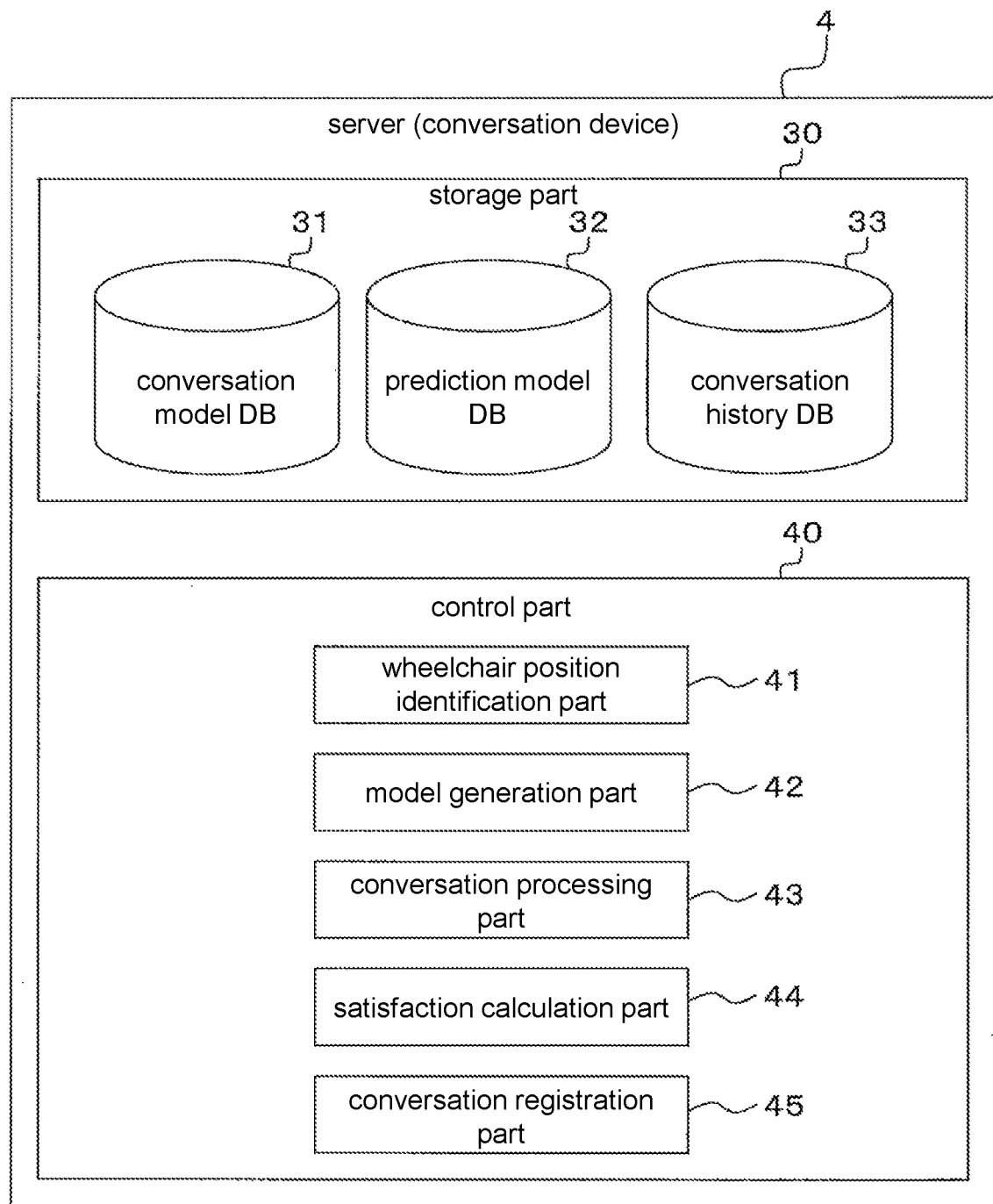
FIG. 3 is an outline configuration diagram of a server according to the embodiment of the invention.

Referring to FIG. 3, a configuration of the server 4 will be described. FIG. 3 is an outline configuration diagram of the server 4. The server 4 includes a storage part 30 and a control part 40. Note that the configuration of the server 4 is not limited to the configuration described herein, and some of the functions of the server 4 (also including some of functions of the control part 40) may be configured as another device or may be configured as functions of the in-vehicle device 5, for example.

The storage part 30 is configured of storage media such as a random access memory (RAM), a read only memory (ROM), a hard disk drive (HDD), and a flash memory. The storage part 30 stores information for automatic driving of the electric wheelchair 2, information for having conversation with the user, and the like. The storage part 30 mainly includes, for example, a conversation model DB 31, a prediction model DB 32, and a conversation history DB 33. Note that a part or an entirety of the information stored in the storage part 30 may be stored in a location other than the server 4 (in another system, for example), and the control part 40 may acquire the information as needed via a communication section, which is not shown.

The conversation model DB 31 stores a conversation model used for having conversation with the user. In the conversation model, how to reply to a request through speech of the user is prescribed. The conversation model may describe a rule determined in advance or may reply an answer learned through machine learning. A different conversation model may be prepared for each user, or a common conversation model may be prepared for all users.

The prediction model DB 32 stores a prediction model that predicts a topic in which the user is interested. A different prediction model is used for each user, and it is possible to identify a topic in which each user is interested. The prediction model is generated through learning using a history of conversation with the user stored in the conversation history DB 33. A method of generating the prediction model will be described later. Note that the prediction model may configure a part of the conversation model (in other words, a configuration in which the prediction model is included in the conversation model may also be employed).

The conversation history DB 33 stores a history of conversation with the user for each user. In the history of the conversation, a situation of conversation at a time point when the conversation with the user is made, details of the conversation, and user's satisfaction with the conversation are associated. The situation of the conversation includes, for example, a situation related to traveling of the electric wheelchair 2, a situation related to a body of the user, a situation related to weather conditions, a situation related to a time, and the like.

The situation related to traveling of the electric wheelchair 2 is, for example, a position of the electric wheelchair 2 in the facility when the conversation is made, an advancing direction of the electric wheelchair 2, a distance up to a next section in a case in which the facility is divided into a plurality of sections, and the like. In the embodiment, the position of the electric wheelchair 2 in the facility is represented as (approximated with) a beacon ID that is identification information of the beacon transmitter 3.

The situation related to the body of the user is, for example, a health state, a disease state, and the like of the user when the conversation is made. The situation related to weather conditions is, for example, a weather at a location where the facility is present at the point when the conversation is made, an air temperature and a humidity in the facility, and the like. The situation related to time is, for example, a clock time, a time zone (for example, before noon, afternoon, in the morning, in the evening, at night, at midnight, or the like), a year and a month, a season, or the like when the conversation is made.

The control part 40 is realized through processing of executing a program using a central processing part (CPU) or by a dedicated circuit or the like. In the case in which the control part 40 is realized by the program, the program can be stored and provided in a computer-readable recording medium (example: CD-ROM). In addition, the program can be provided through a network such as the Internet.

The control part 40 includes a wheelchair position identifying part 41, a model generation part 42, a conversation processing part 43, a satisfaction calculation part 44, and a conversation registration part 45. The functions illustrated in FIG. 3 are functions related to conversation with the user, in particular. The control part 40 has, as a function other than the aforementioned functions, an automatic driving control function for performing control related to automatic driving of the electric wheelchair 2 and causing the electric wheelchair 2 to travel in the facility without any steering operation of the user, for example.

The wheelchair position identifying part 41 acquires information related to the radio waves of the beacon transmitter 3 from the in-vehicle device 5 and identifies the position of the electric wheelchair 2 using the information. The wheelchair position identifying part 41 stores a transmission frequency in association with the beacon ID of each beacon transmitter 3, for example, and can identify the beacon transmitter 3 that is present in the surroundings of the in-vehicle device 5. The wheelchair position identifying part 41 includes a table illustrated in FIG. 4, for example, for each electric wheelchair 2 and manages the position of each electric wheelchair 2 (user) using the table. In this manner, the position of the electric wheelchair 2 in the facility can be approximated with the beacon ID of the beacon transmitter 3.

The model generation part 42 generates the prediction model through learning using the history of the conversation with the user stored in the conversation history DB 33 and stores the prediction model in the prediction model DB 32. The model generation part 42 generates the prediction model using some mechanism before starting a conversation service using the conversation system 1, for example, and then learns the prediction model again at a predetermined timing (for example, at intervals of several hours). The prediction model generated when the service is started cannot necessarily identify a topic in which the user is interested, and precision of identifying the topic in which the user is interested gradually increases after repeating the learning again and again. Therefore, a common prediction model may be used for all users, for example, as a prediction model when the service is started.

The model generation part 42 learns the prediction model again by classifying (clustering) the history of the conversation using elements configuring the history of the conversation as parameters. The situation of the conversation at the point when the conversation with the user is made, the details of the conversation, and the user's satisfaction with the conversation correspond to the elements configuring the history of the conversation. In this manner, it is possible to predict details of speech (the details may be a keyword or a field indicating the details of the speech) with which the user is highly satisfied in the classified history of the conversation by inputting a current situation to the prediction model. Note that a clustering method for classifying the history of the conversation is not particularly limited, and a clustering method such as an EM algorithm or a k-means method, for example, can be used.

In the embodiment, a conditional probability distribution function $P(x|S)$ is assumed as satisfaction. Here, "S" represents details of speech associated with x. "x" is an input (an element configuring the history of the conversation).

Therefore, the satisfaction P is expressed as a parameter by the prediction model $\theta$ as represented by (Equation 1) below. In this manner, it is possible to estimate the satisfaction P related to the details S of the speech in advance using the prediction model $\theta$.

$$\text{Input } x \underset{\theta}{\to} S \quad \text{(Equation 1)}$$

The prediction model $\theta$ can be obtained using the clustering method (for example, the EM algorithm) on the input x as represented by (Equation 2) below.

$$\theta^* = \text{argmax } \text{Log}\{P(x|S)\} \text{ for } x \quad \text{(Equation 2)}$$

The EM algorithm is explained in the following website, for example.

"Thorough explanation of EM algorithm" [searched on Feb. 12, 2019], Internet Internet <URL: https://qiita-.com/kenmatsu4/items/59ea3e5dfa3d4c161efb>

Referring to FIG. 5, prediction model generation processing performed by the model generation part 42 will be described. FIG. 5 illustrates an example of a history of conversation. In FIG. 5, the history of conversation is configured of a "beacon ID", an "advancing direction distance", a "keyword/field", and "satisfaction". The beacon ID is identification information of the beacon transmitter 3. The advancing direction distance is a distance up to the next section in the advancing direction of the electric wheelchair 2. The "keyword/field" is a keyword or a field indicating details of speech to the user. The satisfaction is evaluation of the details spoken to the user. The model generation part 42 learns the prediction model again by classifying the history of the conversation into some clusters using the beacon ID, the advancing direction distance, the keyword/field, and the satisfaction as parameters, for example. As a result, first speech and the second speech are classified into a "cluster A", speech including third speech is classified into a "cluster B", and speech including n-th speech is classified into a "cluster C", for example.

Figure 6:
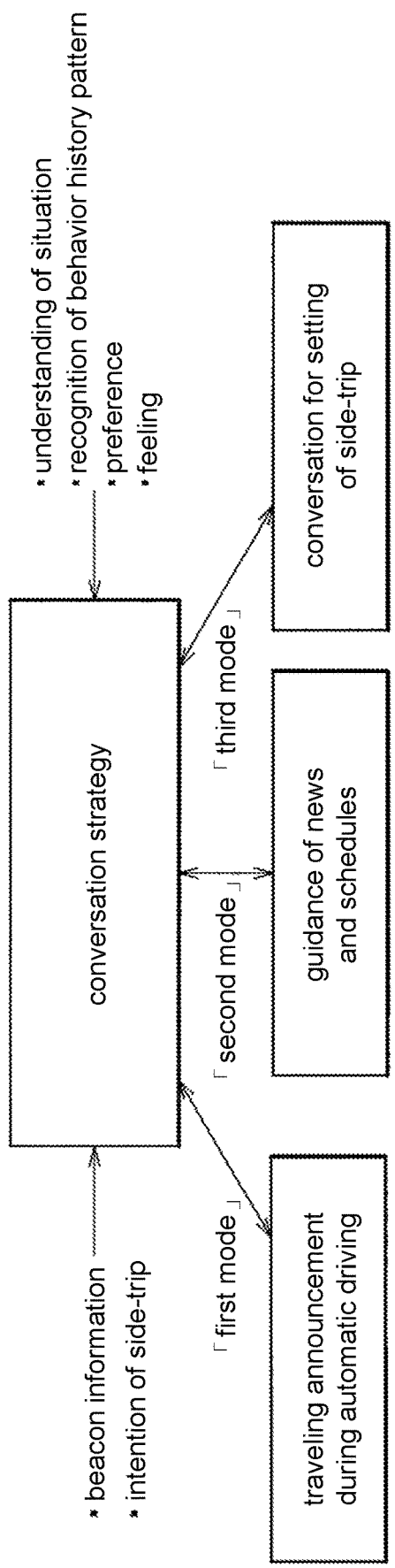
FIG. 6 is an image diagram for explaining an operation mode of a conversation processing part.

The conversation processing part 43 has conversation with the user of the electric wheelchair 2. As illustrated in FIG. 6, the conversation processing part 43 mainly operates in three modes, namely a "first mode", a "second mode", and a "third mode". FIG. 6 is an image diagram for explaining operation modes of the conversation processing part.

The "first mode" is a mode in which speech related to traveling announce during automatic driving is performed. The conversation processing part 43 operates in the first mode in a case in which the electric wheelchair 2 is in the first section Pm, for example. The conversation processing part 43 operating in the first mode provides speech for information related to a change in traveling. The conversation processing part 43 transmits, to the in-vehicle device 5, sound data such as "I will turn at the next corner", "I will stop at the next elevator", "I will watch steps carefully", and "I will watch the oncoming car carefully", for example.

The "second mode" is a mode in which a conversation for preventing the traveling user from feeing bored is made. The conversation processing part 43 operates in the second mode in a case in which the electric wheelchair 2 is in the second section Qn, for example. The conversation processing part 43 operating in the second mode inputs, to the prediction model, a current situation including the beacon ID of the beacon transmitter 3 that is present in the surroundings of the traveling electric wheelchair 2 (that communicates with the electric wheelchair 2) and predicts a topic in which the user is interested using the prediction model. Also, the conversation processing part 43 provides speech about the topic to which the user shows high interest on the basis of the prediction result and then responds to a request from the user, for example. The conversation processing part 43 provides speech first using the prediction model and then has conversation using the conversation model. The conversation processing part 43 transmits, to the in-vehicle device 5, sound data related to news such as "There was an incident of OO", weather forecast such as "It will be a very hot day today", and schedules such as "You have a schedule of OO" as first speech, for example. In other words, the conversation processing part 43 provides speech about a topic to which the user shows high interest in consideration of a situation of the electric wheelchair 2, a behavior history pattern of the user, preference, feeling, and the like as a trigger of conversation.

The "third mode" is a mode in which conversation for setting a change in route (including a side-trip route). The conversation processing part 43 operates in the third mode in a case in which a notification (for example, a sound input) of intension for a change in route (including a side-trip route) is issued, for example. The conversation processing part 43 operating in the third mode transmits, to the in-vehicle device 5, sound data such as "Where do you want to drop by?", for example.

The satisfaction calculation part 44 calculates (estimates) satisfaction of the user from information indicating a reaction of the user received from the in-vehicle device 5 (for example, a video of a captured facial expression or voice). The satisfaction calculation part 44 calculates satisfaction with respect to the topic, to which the user shows high interest, about which the conversation processing part 43 operating in the second mode has provided speech, in particular. A method of calculating the satisfaction of the user is not particularly limited, and the satisfaction calculation part 44 prepares happy, angry, sad, and fun image patterns of the user, for example, in advance and compares the image patterns with a facial expression of the user. Also, the satisfaction calculation part 44 prepares happy, angry, sad, and fun voice patterns in advance and compares the voice patterns with user's voice. Note that the satisfaction calculation part 44 may prepare both the happy, angry, sad, and fun image patterns and the voice patterns of the user and calculate satisfaction from the facial expression and the voice of the user.

The conversation registration part 45 registers a history of conversation with the user for each user in the conversation history DB 33. In other words, the conversation registration part 45 stores the conversation with each user as a history. The conversation registration part 45 registers, in the conversation history DB 33, information about which the conversation processing part 43 operating in the second mode has provided speech as a topic to which the user shows high interest, in particular. The conversation registration part 45 registers a situation of the conversation at point at which the conversation with the user is made, details of the conversation, and user's satisfaction with the conversation in an associated manner in the conversation history DB 33.

Operations of Conversation System

Next, operations of the conversation system 1 according to the embodiment will be described. First, the user inputs a start point and a destination of a route along which automatic driving is performed. Note that the start point may automatically be calculated from radio waves of the beacon transmitter 3 received by the electric wheelchair 2. Also, the start point and the destination may be set by another person instead of the user. The input start point and destination are transmitted to the server 4.

Next, the server 4 calculates a route on the basis of the input start point and destination and causes the electric wheelchair 2 to travel in the facility using automatic driving. Here, in a case in which the user provides a notification (for example, a sound input) of intension for a change in route (including a side-trip route) with respect to the calculated route, the conversation processing part 43 operates in the third mode and transmits sound data such as "Where do you want to drop by?" to the in-vehicle device 5. Then, the server 4 changes the route and sets an intermediate point on the basis of a response result from the user and starts automatic driving on the basis of the change and the setting.

In a case in which the electric wheelchair 2 enters the first section Pm during the automatic driving, the conversation processing part 43 operates in the first mode and provides speech about information related to a change in traveling. Whether or not the electric wheelchair 2 has entered the first section Pm is determined depending on "checking-in and/or checking-out" of the beacon transmitter 3, for example. The conversation processing part 43 transmits, to the in-vehicle device 5, sound data such as "I will turn at the next corner", "I will stop at the next elevator", "I will watch steps carefully", "I will watch the oncoming car carefully", in accordance with details of the first section Pm, for example. Note that the conversation processing part 43 may receive sound (for example, surprised voice and a request) emitted by the user in the first section Pm and transmit an analysis result obtained by analyzing the details thereof to an automatic driving control function, which is not shown. Then, it is better for the automatic driving control function to adjust traveling of the automatic driving on the basis of the user's sound.

Figure 7:
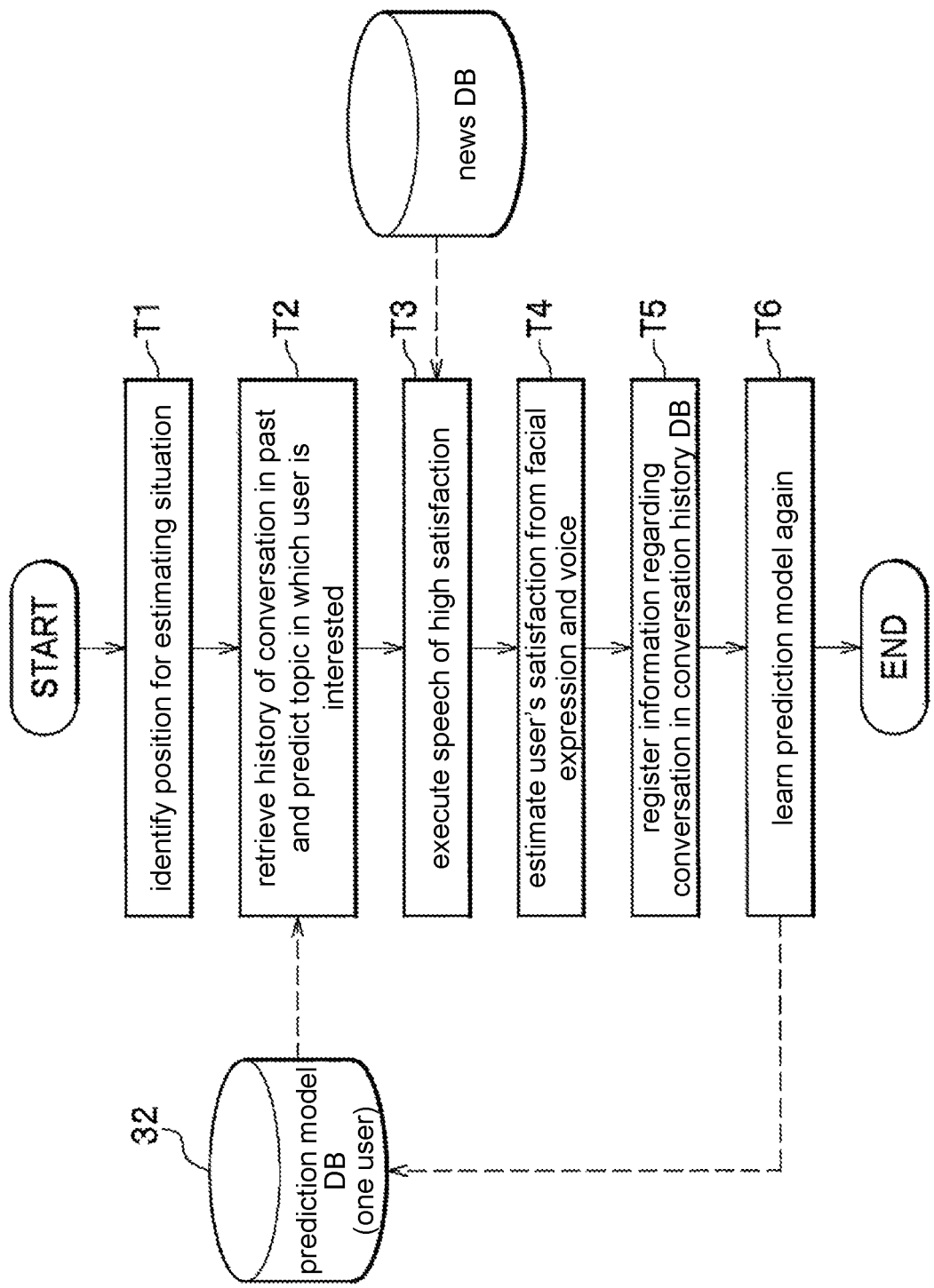
FIG. 7 is a diagram for explaining operations of the conversation system according to the embodiment of the invention and illustrates an example of a flowchart illustrating processing related to speech in a case in which an electric wheelchair travels in a second section.

In a case in which the electric wheelchair 2 has entered the second section Qn, the conversation processing part 43 operates in the second mode and provides, to the user, speech about a topic to which the user shows high interest. Whether or not the electric wheelchair 2 has entered the second section Qn is determined depending on "checking-in and/or checking-out" of the beacon transmitter 3, for example. Referring to FIG. 7 (appropriately see FIGS. 1 to 6), operations related to speech in the case in which the electric wheelchair 2 travels in the second section Qn will be described.

Here, the prediction model for predicting a topic in which the user is interested is generated on the basis of conversation with the user in the past, and the generated prediction model is registered in advance in the prediction model DB 32.

The conversation processing part 43 identifies the position of the electric wheelchair 2 in the facility in order to estimate a situation of the user with which conversation is made (Step T1). The conversation processing part 43 identifies who is traveling at which location in the facility, by acquiring information regarding the beacon transmitter 3 and information regarding the electric wheelchair 2, for example.

Next, the conversation processing part 43 retrieves the conversation history of the user in the past and predicts a topic in which the user is interested (Step T2). The conversation processing part 43 inputs a current situation to the prediction model stored in the prediction model DB 32, for example, and predicts the topic in which the user is interested using the prediction model. The current situation includes a beacon ID of the beacon transmitter 3 that is present in the surroundings of the traveling electric wheelchair 2. Then, the conversation processing part 43 executes speech regarding the topic to which the user shows high interest (that is, speech of high satisfaction) on the basis of the prediction result obtained in Step T2 (Step T3).

Referring to FIG. 5, an image of the processing in Steps T2 and T3 performed by the conversation processing part 43 will be described. In Step T2, the conversation processing part 43 specifies classification (cluster) to which speech in the past belongs in accordance with the position of the electric wheelchair 2, for example, and searches a keyword included in the speech in the past of high satisfaction included in the specified classification (cluster). Here, it is assumed that the beacon position (beacon ID) is "2912" and the advancing direction distance is "3 m". Since this case is similar to the second speech, the cluster A to which the second speech belongs is identified, and a keyword "weather" included in the first speech of high satisfaction in the specified cluster A is acquired.

Next, the conversation processing part 43 provides speech to the user on the basis of details of the predicted speech of high satisfaction, for example, in Step T3. Here, it is assumed that the keyword "weather" is acquired as described above. In this case, the conversation processing part 43 executes speech related to the keyword "weather" (for example, "It will be a very hot day today"). The conversation processing part 43 may search the Internet (represented as "NEWS DB" in FIG. 7) on the basis of the keyword "weather", acquire related information (for example, weather condition information) related to the weather, and execute speech using the acquired related information.

Next, the satisfaction calculation part 44 acquires an imaged video of the facial expression and the voice of the user who has listened to the speech in Step T3 and estimates user's satisfaction from the facial expression and the voice of the user (Step T4).

Next, the conversation registration part 45 registers information regarding the conversation for each user in the conversation history DB 33 (Step T5). The conversation registration part 45 registers the situation of the conversation at the point when the conversation with the user is made, the details of the conversation, and the user's satisfaction with the conversation in an associated manner in the conversation history DB 33, for example. Note that the conversation registration part 45 may register, in the conversation history DB 33, only information regarding the speech of high satisfaction (for example, speech of satisfaction that meets or exceeds preset threshold value).

Then, the model generation part 42 learns the prediction model stored in the prediction model DB 32 again using the history of the conversation with the user stored in the conversation history DB 33, at a predetermined timing (for example, at intervals of several hours) (T6). Precision of identifying the topic in which the user is interested gradually increases by repeatedly learning the prediction model again (in other words, the details of the speech is fed back to the next speech).

The conversation system 1 and the server 4 as the conversation device according to the embodiment are basically configured as described above. Next, effects and advantages of the conversation system 1 and the server 4 as the conversation device will be described.

As illustrated in FIG. 3, the server 4 as the conversation device according to the embodiment is a device that has conversation with the user of the electric wheelchair 2 that travels in the facility in which the plurality of beacon transmitters 3 (see FIG. 1) are disposed. The server 4 includes the conversation processing part 43 that has conversation with the user using the prediction model for predicting a topic in which the user is interested, the conversation registration part 45 that stores the conversation as a history, and the model generation part 42 that generates the prediction model through learning using the stored history of conversation.

In the stored history of conversation, the situation of the conversation at the point when the conversation is made, the details of the conversation, and the user's satisfaction with the conversation are associated. The situation of the conversation includes information with which it is possible to identify the beacon transmitter 3 from which the radio waves are received when the conversation is made. The model generation part 42 learns the prediction model again at a predetermined timing by classifying the history of the conversation using elements included in the history of the conversation as parameters. The conversation processing part 43 predicts a topic in which the user is interested by inputting, to the prediction model, the current situation of the conversation including information, with which the beacon transmitter 3 that is present in the surroundings of the traveling electric wheelchair 2 is identified, and has conversation on the basis of the predicted topic.

As a result, since precision of identifying the topic in which the user is interested increases step by step by repeatedly learning the prediction model again, it is possible to prevent the user of the electric wheelchair 2 from feeing bored.

Also, the situation of the conversation preferably further includes at least any one of a situation related to traveling of the electric wheelchair 2, a situation related to a body of the user, a situation related to weather conditions, and a situation related to a time. In this manner, since it is possible to recognize the situation of the conversation in more detail, the precision of identifying the topic in which the user is interested further increases.

Also, the electric wheelchair 2 may have an automatic driving function. In this manner, a burden on the user to steer the electric wheelchair 2 is reduced, and the user can thus further concentrate on the conversation. Therefore, it is possible for the user to further enjoy the conversation, satisfaction with the conversation is further accurately estimated, and the precision of identifying the topic in which the user is interested thus further increases.

In addition, the facility may include the first section Pm that requires control for causing the electric wheelchair 2 to change traveling and the second section Qn that does not require the control for causing the electric wheelchair to change traveling. In a case in which the electric wheelchair 2 travels in the first section Pm, the conversation processing part 43 preferably has conversation about information regarding a change in traveling. In a case in which the electric wheelchair 2 travels in the second section Qn, the conversation processing part 43 preferably provides speech on the basis of a predicted topic in which the user is interested. In this manner, it is possible to change details of the speech in accordance with the situation and thereby to appropriately travel in the facility.

As illustrated in FIG. 1, the conversation system 1 according to the embodiment is a system that has conversation with the user of the electric wheelchair 2 that travels in the facility in which the plurality of beacon transmitters 3 are disposed. The conversation system 1 includes the server 4 that is the conversation device and the in-vehicle device 5 that can communicate with the server 4 and includes the speaker. As a result, since precision of identifying a topic in which the user is interested increases step by step by repeatedly learning the prediction model again, it is possible to prevent the user of the electric wheelchair 2 from feeling bored.

Although the embodiment of the invention has been described above, the invention is not limited to the aforementioned embodiment and can be carried out in various forms.

The case in which the electric wheelchair 2 travels in the facility using automatic driving has been described in the embodiment. However, the traveling object is not limited to the electric wheelchair 2, and the invention can be applied to a case in which a moving body provided with a drive device and a steering device travels in a facility. The traveling object may be, for example, an electric carrier car in a factory or the like.

In addition, the server 4 includes the wheelchair position identifying part 41, the model generation part 42, the conversation processing part 43, the satisfaction calculation part 44, and the conversation registration part 45 and has been described as an example of the conversation device in the embodiment. However, the in-vehicle device 5 may be provided with these functions, and in such a case, the in-vehicle device 5 is the conversation device.

Also, the satisfaction calculation part 44 estimates (calculates) satisfaction from a facial expression and voice of the user in the embodiment. However, the user himself/herself may evaluate the satisfaction.

What is claimed is:

1. A conversation device that has conversation with a user of an electric wheelchair traveling in a facility in which a plurality of beacon transmitters are disposed, the conversation device comprising:
   a conversation processing part that has conversation with the user using a prediction model that predicts a topic in which the user is interested;
   a conversation registration part that stores the conversation as a history; and
   a model generation part that generates the prediction model through learning using the stored history of the conversation,
   wherein in the history of the conversation, a situation of the conversation at a time point when the conversation is made, details of the conversation, and a user's satisfaction with the conversation are associated,
   the situation of the conversation includes information with which the beacon transmitter that has received radio waves during the conversation is able to be identified,
   the model generation part learns the prediction model again at a predetermined timing by classifying the history of the conversation using elements included in the history of the conversation as parameters, and
   the conversation processing part predicts the topic in which the user is interested by inputting, to the prediction model, a current situation of the conversation including information for identifying the beacon transmitter that is present in the surroundings of the traveling electric wheelchair and has conversation on the basis of the predicted topic.

2. The conversation device according to claim 1, wherein the situation of the conversation further includes at least any one of a situation related to the traveling of the electric wheelchair, a situation related to a body of the user, a situation related to a weather, and a situation related to a time.

3. The conversation device according to claim 1, wherein the electric wheelchair has an automatic driving function.

4. The conversation device according to claim 1,
   wherein the facility includes a first section that requires control for changing the traveling of the electric wheelchair and a second section that does not require control for changing the traveling of the electric wheelchair,
   the conversation processing part provides a speech about information regarding a change in the traveling in a case in which the electric wheelchair travels in the first section, and
   the conversation processing part has conversation on the basis of the predicted topic in which the user is interested in a case in which the electric wheelchair travels in the second section.

5. A conversation system that has conversation with a user of an electric wheelchair traveling in a facility in which a plurality of beacon transmitters are disposed, the conversation system comprising:
   the conversation device according to claim 1; and
   an in-vehicle device that is able to communicate with the conversation device and includes a speaker.

* * * * *